Aug. 10, 1965  R. C. HUG  3,199,150
MOLD FOR DISPENSING SPOUT
Filed Oct. 5, 1962

INVENTOR.
RICHARD C. HUG.
BY

United States Patent Office 3,199,150
Patented Aug. 10, 1965

3,199,150
MOLD FOR DISPENSING SPOUT
Richard C. Hug, St. Louis, Mo., assignor, by mesne assignments, to The Clayton Corporation of Delaware, St. Louis, Mo., a corporation of Delaware
Filed Oct. 5, 1962, Ser. No. 228,623
4 Claims. (Cl. 18—42)

This invention relates to molds for pressure dispenser valves of the type utilizing a rubber seal mounting member and having a metering flow orifice.

In such valves, it has been conventional to utilize a large diameter hollow in the dispensing spout, and to drill, punch or mold a small lateral metering orifice through the stem into the spout. As applied to those valves which operate by tilting, this is particularly unsatisfactory, for the direction of tilt may determine to what extent the flow of product to be dispensed reaches a metering orifice which may be only partly uncovered from the surrounding rubber seal. Regardless how the valve is to be operated, whether by tilting or pushing down, when a drilled or punched metering orifice is used, an extra shop operation is necessary, which adds to the manufacturing cost.

In a mold for molding such a metering orifice, the contact area between a pin for the orifice and a central core would extend transversely across the end of the metering orifice to be formed. Any flash in that area would make the orifice smaller; and thus interfere with its precise metering or block it altogether.

The purposes of the present invention are to provide a unique mold for such a dispensing valve, in which a metering-orifice-forming core portion may be needle-thin and still will withstand breakage; also one in which any flash which does form will not be aligned across the metering orifice, and hence will not diminish its effective size. A still further purpose is to provide a mold which, without extra complications, will provide for cleaning out the metering orifice. Additional purposes will be evident from the details of this specification.

The invention may be described generally as providing two hollowed mold members with projections whose ends meet at a parting plane to form the lateral flow passage of the dispensing valve, such meeting ends having semi-cylindrical cutouts which support a needle-like extension of the central core pin. As a further feature, the needle-like extension projects beyond the mold member projections to provide the clean-out recess.

Figure 1:
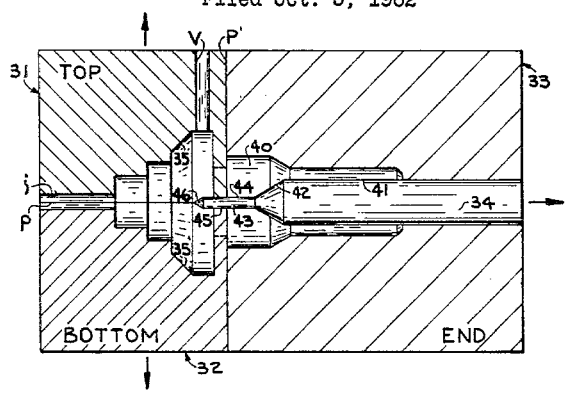
Figure 2:
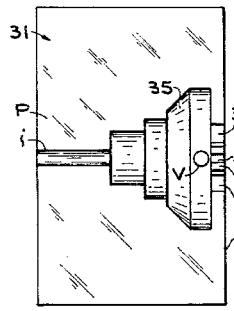
Figure 3:
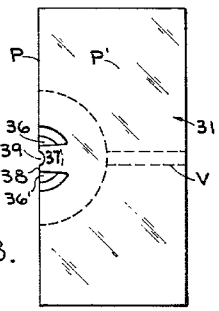
Figure 4:
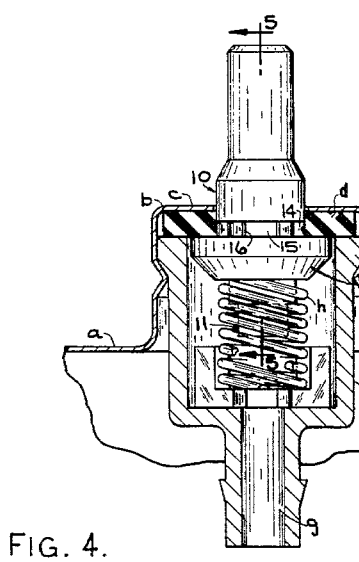
Figure 5:
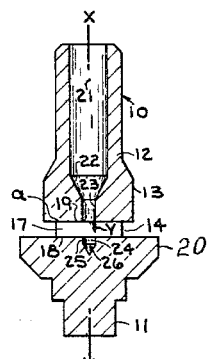

In the accompanying drawings: FIGURE 1 is a cross-sectional sketch of an assembled mold for forming such valve stem, the arrows indicating the direction of parting. FIGURE 2 is a bottom view of the top mold member of FIGURE 1. FIGURE 3 is a view of the right side of said top mold member. FIGURE 4 is a side elevation of the molded valve stem, assembled with co-operating valve members shown in section. FIGURE 5 is a sectional view taken along line 5—5 of FIGURE 4.

The type of valving assembly with which the present invention is advantageously utilized is shown in FIGURE 4. The container top member $a$ has a central elevated dome $b$ including a flat, centrally apertured dome top $c$ through whose aperture a valve spout member generally designated 10 projects. Such spout member 10 is mounted in a rubber sealing washer $d$ which is clamped against the dome top $c$ by the top flange $e$ of a plastic molded adaptor or "nipple" $f$, through whose bottom inlet $g$ the container contents flow to the valve spout member 10. A compression spring $h$, based within the adaptor $f$ and whose top coil surrounds a bottom guide projection 11 of the spout member 10, urges it upward and thus restores it to closed, sealed position if tilted or depressed.

The valve spout member 10 is formed integrally by molding plastic material of sufficient rigidity to permit such tilting or depressing. Except for its ports 15 and the lateral flow passage 17 which they form, the member 10 is generally symmetrical about its axis $x$—$x$. It includes, as its upper portion, a tubular stem 12 which serves as a dispensing spout, whose outer wall may include an enlarged lower cylindrical wall portion 13, preferably molded without any parting line. Below the wall portion 13, the valve spout member 10 has an inward groove 14 interrupted by two relatively large, oppositely disposed flow openings or ports 15 having side walls 16 which may taper inward slightly as shown for purposes of molding. The two flow openings 15 join at the center of the valve spout member 10 to provide together a lateral flow passage 17, having a bottom wall 18 and a top wall 19.

The bottom wall 18 demarks the upper imperforate end of a valve head portion 20 which is of substantially larger diameter than the lower cylindrical portion 13, and seats against the under surface of the sealing washer $d$.

The tubular stem 12 has an outlet bore 21 extending along the axis $x$—$x$ from its upper end down to a level somewhat above the lateral flow passage top wall 19. Thence inwardly, there is provided a tapering bore portion 22 which narrows to a metering bore 23 immediately above the level of the flow passage top wall 19. The metering bore 23 provides flow communication from the lateral flow passage 17 to the outlet bore 21. The cross-sectional area of the metering bore 23 may be needle-thin, while the flow openings 15 are of much greater area. This fact, plus flow communication by means of the groove 14 when the valve spout member 10 is tilted, results in full flow to the metering bore 23, unaffected by degree or direction of tilt. This result is in contrast to prior constructions in which a single metering orifice through the side wall of a stem, whether formed by molding or drilling, might be only partially uncovered on tilting, resulting in reduced rate of flow through the orifice.

The bottom wall 18 of the flow passage 17 has a blind clean-out recess or depression 24 in registration with the metering bore 23 along the axis $x$—$x$. The recess 24 has an upper bore portion 25 whose diameter is no greater than that of the metering bore 23; and from its upper bore portion 25 it tapers to a pointed recess bottom 26.

Should anything clog the metering bore 23, such clogging is readily relieved by pressing an ordinary needle axially inward into the outlet bore 21. Such needle's tip will be guided by the tapering bore portion 22 to and through the metering bore 23, and it will press the clogging material axially downward. Material not broken up or reoriented may be packed into the tapering bore 26 of the clean-out recess 24. For clean-out purposes, therefore, a needle will be chosen whose diameter is smaller than the metering bore 23.

FIGURE 1 illustrates the novel construction of a mold for the valve stem of FIGURES 4 and 5. The mold shown in FIGURE 1 has four basic parts: A top mold member generally designated 31, a bottom mold member generally designated 32, an end member generally designated 33 and a core pin generally designated 34. The direction of the separation of the mold members 31, 32 and 33 is shown by the arrows in FIGURE 1. A flow inlet $i$ is shown schematically, as is a vertical passage $v$ which may be utilized for venting or to accommodate an ejector pin, not shown.

These mold members 31, 32 are utilized to mold that portion of the valve spout member 10 beginning at the base of the lower cylindrical portion 31 (that is, with the lateral flow passage top wall 19), and extending to the bottom of its integral portions including the axial bottom guide projection 11. The hollows of the top and bottom mold members 31, 32 meet at a parting plane p, which is shown in FIGURE 1 to extend horizontally. Assuming that the top and bottom mold members 31, 32 are free of the end mold member 33, as shown, it will meet them along a second parting surface p', which, if substantially planar as shown, intersects the parting plane p at a 90° angle.

In the top and bottom mold members 31, 32 are machined symmetrical hollows 35, 35' corresponding in shape to the valve head 20 and the bottom guide projection 11. The hollows 35, 35' connect to the parting surface p' by pie-shaped passages 36, 36' in each of said top and bottom mold members 31, 32. These passages 36, 36' result from leaving, within each hollow 35, 35' and projecting inwardly toward the parting plane p, a projection 37 having an end 38 at the parting plane p. Each projection 37 is of such shape as to form one of the flow openings 15. The projecting ends 38 of the top mold member 31 meet the projecting ends 38 of the bottom mold member 32 at the parting plane p, so that, taken together, the projections 37 form the top wall 19, the bottom wall 18 and tapering side wall 16 of the resulting flow passage 17. The top wall 19 and the enlarged cylindrical wall portion 13 are formed by spacing the projections 37 at an axial distance from the inwardly tapering portion 42 of the core pin 34.

The end mold member 33 is in the form of a block having a stem hollow 40 formed by boring and counter boring along an axis which establishes the axis x—x, to form the outer surface of the tubular stem 12, without any parting-line flash. Mounted along the axis of the stem hollow 40 is the core pin 34, having, at its end innermost within the hollow 40 of the mold member 33, a cylindrical core pin portion 41 of such diameter as to form the outlet bore 21; thence an inwardly tapering portion 42 to form the tapering bore portion 22, and terminating in a needle-like tip extension 43. The cylindrical core pin portion 41 and inwardly tapering portion 42 together form the cavity-forming portion of the core pin 34. The tip extension 43 is of such length as to extend beyond the parting surface p', so that it enters along the parting plane p between the top mold member 31 and the bottom mold member 32.

In order to permit such entry, the ends 38 of the projections 37 have semi-cylindrical cut-outs 39 of needle-like radius equal to that of the needle tip's cylindrical portion 45 hereafter referred to. When the top and bottom mold members 31, 32 are assembled along the parting plane p, these cut-outs 39 together provide firm, bushing-like support for the needle-like projection 43, minimizing the incidence of breakage. Also, their centering action is positive, practically eliminating the formation of flash in molding.

The needle-like tip 43 has in fact three portions: a first portion 44 nearest the inwardly tapering portion 42, to mold the metering orifice 23; a second cylindrical portion 45, adjacent thereto, which fits tightly within the semi-cylindrical cut-outs 39 of the projections 37; and a tapering needle tip portion 46 which extends inwardly from the projections 37 into the hollows 35, 35', to mold the clean-out recess 24.

If on molding any flash is in fact formed such flash will not extend across the metering orifice 23, but rather across the large flow passage 17 parallel to the axis x—x. A small amount of such flash is indicated by the dashes designated y in FIGURE 5. Unless the needle-like tip extension 43 were made greatly under size, there could not be enough of such flash across the flow passage 17 to effect the rate of flow to the metering orifice 23.

Because of the small size of the parts, a cylindrical fit against the needle-like extension 43 is to be preferred to a tapering fit. However, minor modifications which will be apparent to those familiar with the art, and within the scope of the claims, are included herein; and the present invention is not to be construed narrowly, but rather as fully coextensive with the claims.

I claim:
1. A mold for a hollow dispensing spout member of the type having a central metering orifice in communication with a lateral flow passage having diametrically opposite ports, comprising at least
   two mold members meeting along a parting plane and symmetrically hollowed therefrom to define such a spout member and, in the region of such flow passage, meeting along a longitudinal parting plane at 90° to such opposed ports,
   each said mold member having a projection whose end meets the end of the projection of the other along said parting plane whereby to form the lateral flow passage,
   further comprising a core pin having a body extending longitudinally along the parting plane whereby to form the hollow of the dispensing spout,
   the core pin having a needle-like tip extension including a portion adjacent to the core pin body portion,
   said extension portion being of such length as to extend to the mold member projections and being of such diameter as to provide a metering orifice communicating between the lateral flow passage and the hollow of the spout,
   characterized in that
   the meeting ends of the mold projections each has at its center a semi-cylindrical cutout whose radius equals the radius of the needle-like tip, and
   the needle-like tip has a further extended portion fitting within and penetrating the circle formed by the semi-cylindrical cutouts of the mold projection,
   whereby the needle-like tip is firmly supported by the mold projections and the formation of flash across the metering orifice is avoided.

2. A dispensing spout mold as defined in claim 1, further characterized in that
   the needle-like tip has a still further extension beyond the meeting ends of the mold projections,
   whereby to form a clean-out recess in the bottom of such flow passage in registration with the metering orifice.

3. A mold for a hollow dispensing spout member of the type having a central metering orifice through a wall in communication with a lateral flow passage, comprising at least
   two mold members meeting along a parting plane and symmetrically hollowed therefrom to define such a spout member,
   a core pin supported between the mold members along the parting plane at a core pin end,
   the core pin having a cavity-forming portion terminating in an axial needle-like tip extension at the end opposite the supported core pin end,
   the needle tip extension including a metering orifice-forming portion adjacent to the cavity-forming portion of the core pin, and axially therebeyond a support-receiving portion,
   the said two mold members each having a projection whose end meets the end of the projection of the other along said parting plane whereby to provide such lateral flow passage,
   the said projections being spaced at such an axial distance from the cavity-forming portion of the core pin as to provide such wall having the central metering orifice,
   the projecting ends so meeting having semi-circular cut-outs whose radii equal that of the support-receiving portion,
   whereby on assembly for molding to sealedly grasp the support-receiving portion of the needle tip extension beyond such wall so to be molded, and thereby avoid the formation of flash across the orifice.

4. A mold for a hollow dispensing spout member of the type having a central metering orifice through a wall in communication with a lateral flow passage, comprising at least two mold members meeting along a parting plane and symmetrically hollowed therefrom to define that portion of the spout member which includes such lateral flow passage, a third mold member positioned adjacent the said two mold members and hollowed to define the stem portion of the spout member outwardly adjacent to said portion which includes such lateral flow passage, a core pin having a cavity-forming portion supported along the center line of the hollow of such third mold member and terminating in an axial needle-like tip extension projecting beyond said third mold member, the needle tip extension including a metering orifice-forming portion adjacent to the cavity-forming portion of the core pin, and axially therebeyond a support-receiving portion, the said two mold members each having a projection whose end meets the end of the projection of the other along said parting plane whereby to provide such lateral flow passage, the said projections being spaced at such an axial distance from the cavity-forming portion of the core pin as to provide such wall having the central metering orifice, the projecting ends so meeting having semi-circular cut-outs whose radii equal that of the support-receiving portion, whereby on assembly for molding to sealedly grasp the support-receiving portion of the needle tip extension beyond such wall so to be molded, and thereby avoid the formation of flash across the orifice.

References Cited by the Examiner

UNITED STATES PATENTS

| | | | |
|---|---|---|---|
| 1,959,648 | 5/34 | Tandy | 22—151 XR |
| 2,631,814 | 3/53 | Abplanalp | 251—353 |
| 2,783,502 | 3/57 | Abplanalp | 18—42 |
| 2,975,481 | 3/61 | Kauffman | 18—42 |
| 2,991,044 | 7/61 | Briechle | 251—353 |
| 2,994,921 | 8/61 | Hullgren | 18—42 |
| 3,049,767 | 8/62 | Guyot | 22—151 XR |
| 3,064,310 | 11/62 | Cooprider | 18—42 |

FOREIGN PATENTS 599,570  3/48  Great Britain.

MICHAEL V. BRINDISI, *Primary Examiner.*

ISADORE WEIL, WILLIAM J. STEPHENSON,
*Examiners.*